April 20, 1954 B. G. DAMMERS 2,676,247
CIRCUIT ARRANGEMENT FOR SILENT TUNING
IN FREQUENCY-MODULATION RECEIVERS
Filed July 13, 1951
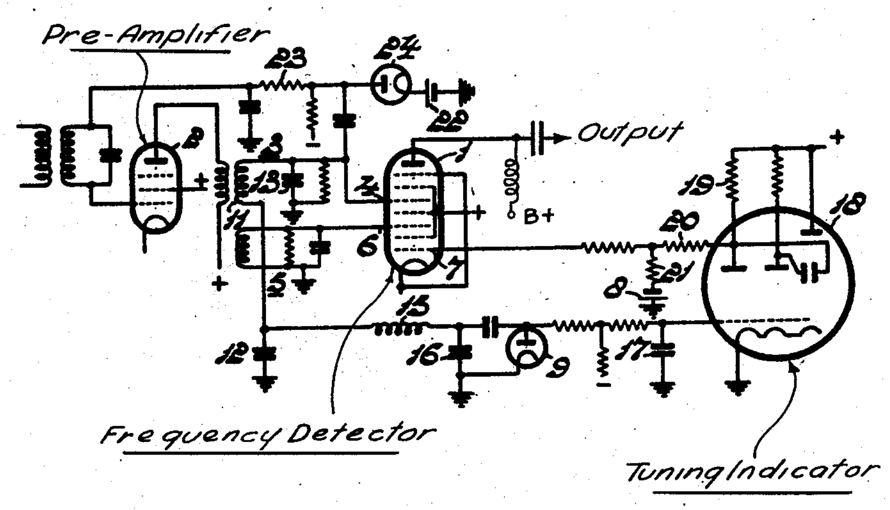
INVENTOR
Bernhardus Gerhardus Dammers
By [signature]
AGENT Patented Apr. 20, 1954

2,676,247

UNITED STATES PATENT OFFICE 2,676,247

CIRCUIT ARRANGEMENT FOR SILENT TUNING IN FREQUENCY-MODULATION RECEIVERS

Bernhardus Gerhardus Dammers, Eindhoven, Netherlands, assignor to Hartford National Bank and Trust Company, Hartford, Conn., as trustee Application July 13, 1951, Serial No. 236,515

Claims priority, application Netherlands July 28, 1950

3 Claims. (Cl. 250—20)

The invention relates to a circuit-arrangement for silent tuning in a frequency-modulation receiver comprising a frequency demodulator to demodulate the incoming signal, a cut-off voltage source to cut off the frequency demodulator when the incoming signal remains below the required level, a network which is selective for the central frequency of the incoming signal and a rectifier coupled with the latter to produce a control-voltage for the release of the frequency demodulator, when the signal exceeds the level.

Use is particularly made of a frequency detector to perform the function of the frequency demodulator. The term "frequency detector" is to be understood to mean an electron discharge tube combined with two coupled circuits tuned to the central frequency of the incoming signal, to which the oscillations to be demodulated are supplied and each of which is connected to either of the two control-grids of the tube. A low-frequency oscillation which to a first approximation is proportional to the frequency of the incoming signal is obtained from the anode circuit of this tube. A preferred embodiment of a frequency detector is that in which such high signal voltages are fed to the two control-grids of the electron discharge tube that the tube has a saturation characteristic curve for the signal voltages and consequently functions not only as a demodulator but also as a limiting element.

A frequency-modulation receiving circuit-arrangement, more particularly one in which use is made of a frequency detector to operate as the frequency demodulator, usually has side tunings, that is to say, if the receiver is tuned at the side of the carrier wave of a strong incoming signal, there is nevertheless produced a low-frequency output signal, which is usually strongly distorted.

According to the invention these side tunings are avoided by supplying the voltage across one of the input circuits of the frequency demodulator, more particularly the frequency detector, to a rectifying circuit having a threshold voltage, so that in the event of an excessively strong incoming signal there is produced a control-voltage, reducing the amplification of one or more tubes of the receiving circuit-arrangement.

In order that the invention may be more clearly understood and readily carried into effect, it will now be described in detail with reference to the accompanying drawing, in which one embodiment is shown.

Referring to the single figure of the drawing, reference numeral 1 designates a frequency detector tube; 2 a pre-amplification tube; 3 and 5 two coupled circuits tuned to the central frequency of a frequency-modulated incoming signal and respectively connected to the control-grids 4 and 6 of the frequency detector tube 1. Subsequent to amplification in the tube 2 an incoming signal is supplied to the circuit 3, which is inductively coupled with the anode circuit of the tube 2 and to the circuit 5, respectively, which is coupled with the circuit 3, the phase shift between the voltages across the circuits 3 and 5 respectively varying with the frequency of the incoming signal. Consequently the tube 1, together with the circuits 3 and 5, operates as a frequency detector for the incoming signal, while, particularly if the voltages across the circuits 3 and 5 are sufficiently high, it also operates as a limiting element.

Across the circuit of the control-grid 7 of the tube 1 is operative a voltage source 8, which cuts off the tube 1, if the incoming signal remains below the required level.

The voltage across the circuit 3 is supplied through a comparatively large capacitor 12 to a network which is selective for the central frequency of the incoming signal, i. e. a circuit formed by the capacitor 12, an inductance 15 and a second capacitor 16 and having a comparatively high circuit quality. With the use of a rectifier 9, the voltage across the capacitor 16 is rectified and supplied through a smoothing filter 17 to the grid of a tuning indicator tube 18, the anode resistor of which having produced across it an amplified voltage which, in the event of a sufficiently strong incoming signal, eliminates the cutting-off produced by the source 8, subsequent to voltage division through resistors 20 and 21, the source 8 being operative across the latter.

If the central frequency of the incoming oscillations does not correspond with the tuning frequency of the circuits 3 and 5, a strong signal will nevertheless produce a low-frequency voltage across the output circuit of the frequency detector tube 1 (side tuning). This not only has the disadvantage that an undue interference with the weaker transmitter is produced, but it also appears that this side tuning is attended with a considerable amount of distortion and microphony phenomena.

In order to avoid this side tuning, the voltage across the circuit 3 is supplied, in accordance with the invention, to a rectifier 24 comprising a threshold voltage source 22, which becomes conductive when the voltage across the circuit 3 assumes an excessive value and which produces a control-voltage subsequent to smoothing in a filter 23, this control-voltage being supplied to the grid of the tube 2 in order to reduce the amplification of the tube 2 and, hence, to counteract a further increase of the incoming signals beyond this maximum value.

Irrespective of the strength of a transmitter and irrespective of a detuning, if any, of the receiving circuit, the voltage across the circuits 3 and 5, respectively, thus remains within comparatively narrow limits, the tube 1 being driven in the most favourable portion of its characteristic curve. However, the voltage across the selective network 12, 15, 16 only then attains the value required to release the tube 1, cut off by the source 8, subsequent to rectification, when the frequency of the incoming signal is substantially equal to the tuning frequency of the circuits 12, 15, 16, i. e. when the receiving circuit-arrangement is tuned correctly.

The rectifier 24 may be incorporated in the tube 2, or it may be formed by the grid-cathode rectifying of one of the tubes of the receiving circuit-arrangement.

What I claim is:

1. In a frequency modulation receiver, a silent tuning device responsive to an applied frequency modulated signal, said tuning device comprising a signal amplifying stage, a frequency demodulator for demodulating said signal, said demodulator having first and second input circuits therefor, means to apply said signal through said stage to the input circuits of said demodulator, means to apply a cut-off voltage to said demodulator having a magnitude at which said demodulator in the absence of a signal above a predetermined level is normally inoperative, a network tuned to the central frequency of said signal and coupled to one of said demodulator circuits, means including a first rectifier coupled to said network to develop a first control voltage dependent upon the level of said signal, means to supply said first control voltage to said demodulator to counteract said cut-off voltage to an extent releasing the demodulator in the condition wherein said signal exceeds said predetermined level, means coupled to one of said demodulator input circuits and including a second and threshold rectifier which is rendered conductive when said signal attains a predetermined threshold value to produce second control voltage, and means to supply said second control voltage to said amplifying stage to prevent the value of said signal from exceeding said predetermined threshold value.

2. In a frequency modulation receiver, a silent tuning device responsive to an applied frequency modulated signal, said tuning device comprising a signal amplifying stage, a frequency demodulator for demodulating said signal, said demodulator having first and second input circuits therefor, means to apply said signal through said stage to the input circuits of said demodulator, means to apply a cut-off voltage to said demodulator having a magnitude at which said demodulator in the absence of a signal above a predetermined level is normally inoperative, a network tuned to the central frequency of said signal and coupled to one of said demodulator circuits, means including a first rectifier coupled to said network to develop a first control voltage dependent upon the level of said signal, means to supply said first control voltage to said demodulator to counteract said cut-off voltage to an extent releasing the demodulator in the condition wherein said signal exceeds said predetermined level, a second rectifier, means to apply a predetermined threshold bias to said second rectifier, means to apply said signal through one of said demodulator circuits to said second rectifier to render said second rectifier conductive when said signal exceeds said predetermined threshold bias, means coupled to said second rectifier to obtain a second control voltage therefrom when said second rectifier is in the conductive condition, and means to supply said second control voltage to said amplifying stage to prevent the value of said signal from exceeding said predetermined threshold value.

3. A silent tuning device, as set forth in claim 2, wherein said demodulator is constituted by a frequency detector including an electron discharge tube provided with first, second and third control grids, said first and second input circuits being coupled to said second and third grids, respectively, said cut-off voltage being applied to said first grid.

References Cited in the file of this patent

UNITED STATES PATENTS

| Number | Name | Date |
|---|---|---|
| 2,272,401 | Chaffee | Feb. 10, 1942 |
| 2,455,450 | Thompson | Dec. 7, 1948 |